United States Patent
Arvold et al.

(10) Patent No.: US 11,422,985 B2
(45) Date of Patent: Aug. 23, 2022

(54) INTERACTIVE DATA MODELING

(71) Applicant: Tableau Software, LLC, Seattle, WA (US)

(72) Inventors: Michael John Arvold, Seattle, WA (US); Ross Thomas Bunker, Seattle, WA (US); Daniel Philip Cory, Seattle, WA (US); Daniel William DeKlotz, Seattle, WA (US); Vivek Anup Maharajh, Seattle, WA (US); Britta Claire Nielsen, Seattle, WA (US); Douglas Alan Thomae, Seattle, WA (US)

(73) Assignee: Tableau Software, LLC, Seattle, WA (US)

( * ) Notice: Subject to any disclaimer, the term of this patent is extended or adjusted under 35 U.S.C. 154(b) by 32 days.

(21) Appl. No.: 16/944,043

(22) Filed: Jul. 30, 2020

(65) Prior Publication Data

US 2022/0035774 A1 Feb. 3, 2022

(51) Int. Cl.
| | |
|---|---|
| *G06F 16/21* | (2019.01) |
| *G06F 16/2457* | (2019.01) |
| *G06F 16/242* | (2019.01) |
| *G06F 16/215* | (2019.01) |

(52) U.S. Cl.
CPC .......... *G06F 16/212* (2019.01); *G06F 16/215* (2019.01); *G06F 16/2423* (2019.01); *G06F 16/24578* (2019.01); *G06F 16/211* (2019.01)

(58) Field of Classification Search
CPC ................. G06F 16/212; G06F 16/215; G06F 16/24578; G06F 16/2423; G06F 16/211

USPC ........................................ 707/803, 602, 802
See application file for complete search history.

(56) References Cited

U.S. PATENT DOCUMENTS

| | | | |
|---|---|---|---|
| 5,550,971 A | 8/1996 | Brunner et al. | |
| 5,689,711 A | 11/1997 | Bardasz et al. | |
| 9,383,913 B2 | 7/2016 | Hoyer et al. | |
| 9,489,119 B1 | 11/2016 | Smith, Jr. | |
| 9,760,240 B2 * | 9/2017 | Maheshwari | ......... G06F 16/248 |
| 10,705,695 B1 | 7/2020 | Porath et al. | |

(Continued)

FOREIGN PATENT DOCUMENTS

WO 2006060773 A2 6/2006

OTHER PUBLICATIONS

Office Communication for U.S. Appl. No. 16/984,014 dated Aug. 10, 2021, pp. 1-32.

(Continued)

*Primary Examiner* — Phong H Nguyen
(74) *Attorney, Agent, or Firm* — John W. Branch; Branch Partners PLLC

(57) ABSTRACT

Embodiments are directed to managing data models. A data source that includes records may be provided. Source fields may be determined based on the records and the source fields may be displayed in a source panel. A data model that includes a source data object may be displayed. Relationships between the source fields may be determined based on values in the records. In response to providing a relationship between the source fields, a data object that includes a key field and one or more data fields that correspond to the relationship may be generated. The data model may be modified to include the data object and to remove the source fields that correspond to the data fields.

20 Claims, 12 Drawing Sheets

(56) References Cited

U.S. PATENT DOCUMENTS

| | | |
|---|---|---|
| 10,783,162 B1 | 9/2020 | Montague et al. |
| 2004/0205562 A1* | 10/2004 | Rozek .................. G06F 40/151 |
| | | 715/239 |
| 2010/0235771 A1 | 9/2010 | Gregg, III |
| 2010/0313157 A1 | 12/2010 | Carlsson et al. |
| 2010/0318583 A1 | 12/2010 | Cohen |
| 2011/0219321 A1 | 9/2011 | Gonzalez Veron et al. |
| 2012/0311497 A1 | 12/2012 | Bear et al. |
| 2014/0026084 A1 | 1/2014 | Gilboa |
| 2014/0058789 A1 | 2/2014 | Doehring et al. |
| 2014/0074888 A1 | 3/2014 | Potter et al. |
| 2014/0215405 A1 | 7/2014 | Breedvelt-Schouten |
| 2014/0267287 A1 | 9/2014 | Dodgen et al. |
| 2014/0372956 A1 | 12/2014 | Bisca et al. |
| 2015/0112998 A1 | 4/2015 | Shankar et al. |
| 2016/0103908 A1* | 4/2016 | Fletcher ........... G06Q 10/06393 |
| | | 707/722 |
| 2016/0224532 A1 | 8/2016 | Miller et al. |
| 2016/0224616 A1 | 8/2016 | Beacom et al. |
| 2016/0314605 A1 | 10/2016 | Filippi et al. |
| 2017/0010787 A1 | 1/2017 | Ranganathan et al. |
| 2017/0075557 A1 | 3/2017 | Noble et al. |
| 2017/0091317 A1 | 3/2017 | Cummings et al. |
| 2017/0102694 A1 | 4/2017 | Enver et al. |
| 2017/0103103 A1 | 4/2017 | Nixon et al. |
| 2017/0140068 A1 | 5/2017 | Oh et al. |
| 2017/0154088 A1 | 6/2017 | Sherman |
| 2017/0177681 A1 | 6/2017 | Potiagalov et al. |
| 2017/0177744 A1 | 6/2017 | Potiagalov et al. |
| 2017/0178368 A1 | 6/2017 | Noon et al. |
| 2017/0193049 A1 | 7/2017 | Grehant |
| 2017/0213131 A1 | 7/2017 | Hammond et al. |
| 2017/0220633 A1 | 8/2017 | Porath et al. |
| 2017/0286526 A1 | 10/2017 | Bar-Or et al. |
| 2017/0293666 A1 | 10/2017 | Ragavan et al. |
| 2018/0024731 A1 | 1/2018 | Sanches et al. |
| 2018/0129369 A1* | 5/2018 | Kim ........................... G06F 8/38 |
| 2018/0218050 A1 | 8/2018 | Porath et al. |
| 2018/0260106 A1 | 9/2018 | Leonard et al. |
| 2019/0034489 A1 | 1/2019 | Ziegler |
| 2019/0095395 A1 | 3/2019 | Piecko |
| 2019/0286668 A1* | 9/2019 | Puzicha ................ G06F 40/166 |
| 2019/0294720 A1 | 9/2019 | Beringer et al. |
| 2019/0332599 A1 | 10/2019 | Woo |
| 2019/0384836 A1 | 12/2019 | Roth et al. |
| 2020/0104401 A1 | 4/2020 | Burnett et al. |
| 2020/0104402 A1 | 4/2020 | Burnett et al. |
| 2020/0372057 A1 | 11/2020 | Tonkin et al. |
| 2021/0263900 A1* | 8/2021 | Joyce ..................... G06N 20/00 |

OTHER PUBLICATIONS

Furmanova, Katarina et al., "Taggle: Scalable Visualization of Tabular Data through Aggregation," IEEE Transactions on Visualization and Computer Graphics, 2017, pp. 1-14.

Brunel, Robert et al., "Supporting Hierarchical Data in SAP HANA," 2015 IEEE 31st International Conference on Data Engineering (ICDE), 2015, pp. 1-12.

Pienta, Robert et al., "VISAGE: Interactive Visual Graph Querying," AVI '16, Jun. 7-10, 2016, Bari Italy, pp. 272-279.

Von Landesberger, Tatiana et al., "A System for Interactive Visual Analysis of Large Graphs Using Motifs in Graph Editing and Aggregation," VMV 2009, pp. 1-9.

Office Communication for U.S. Appl. No. 16/586,554 dated Jul. 24, 2020, pp. 1-27.

Office Communication for U.S. Appl. No. 16/586,554 dated Nov. 24, 2020, pp. 1-28.

Office Communication for U.S. Appl. No. 16/586,554 dated Feb. 16, 2021, pp. 1-7.

Office Communication for U.S. Appl. No. 16/586,554 dated Apr. 2, 2021, pp. 1-37.

Office Communication for U.S. Appl. No. 16/725,986 dated Apr. 2, 2021, pp. 1-23.

Papenbrock, Thorsten et al., "Data-driven Schema Normalization," in Proceedings of the 20th International Conference on Extending Database Technology, 2017, pp. 342-353.

Office Communication for U.S. Appl. No. 16/586,554 dated Sep. 27, 2021, pp. 1-45.

Office Communication for U.S. Appl. No. 16/725,986 dated Sep. 30, 2021, pp. 1-10.

Office Communication for U.S. Appl. No. 17/091,536 dated Nov. 5, 2021, pp. 1-25.

Office Communication for U.S. Appl. No. 16/586,554 dated Dec. 15, 2021, pp. 1-7.

Office Communication for U.S. Appl. No. 16/984,014 dated Jan. 3, 2022, pp. 1-31.

Office Communication for U.S. Appl. No. 16/586,554 dated Feb. 24, 2022, pp. 1-47.

Office Communication for U.S. Appl. No. 16/984,014 dated Mar. 18, 2022, pp. 1-5.

* cited by examiner

*Fig. 5*

INTERACTIVE DATA MODELING

TECHNICAL FIELD

The present invention relates generally to data analysis, and more particularly, but not exclusively to, generating data models based on relationships in data sets.

BACKGROUND

Organizations are generating and collecting an ever increasing amount of data. This data may be associated with disparate parts of the organization, such as, consumer activity, manufacturing activity, customer service, server logs, or the like. In some cases, organizations may be provided data sources or databases that include denormalized data. In some cases, analysis of denormalized data may be disadvantageous, at least because of the duplicated or redundant data that may be included in the denormalized data sources. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein:

FIG. 5 illustrates a logical schematic of a data source for interactive data modeling in accordance with one or more of the various embodiments;

DETAILED DESCRIPTION OF VARIOUS EMBODIMENTS

Figure 1:
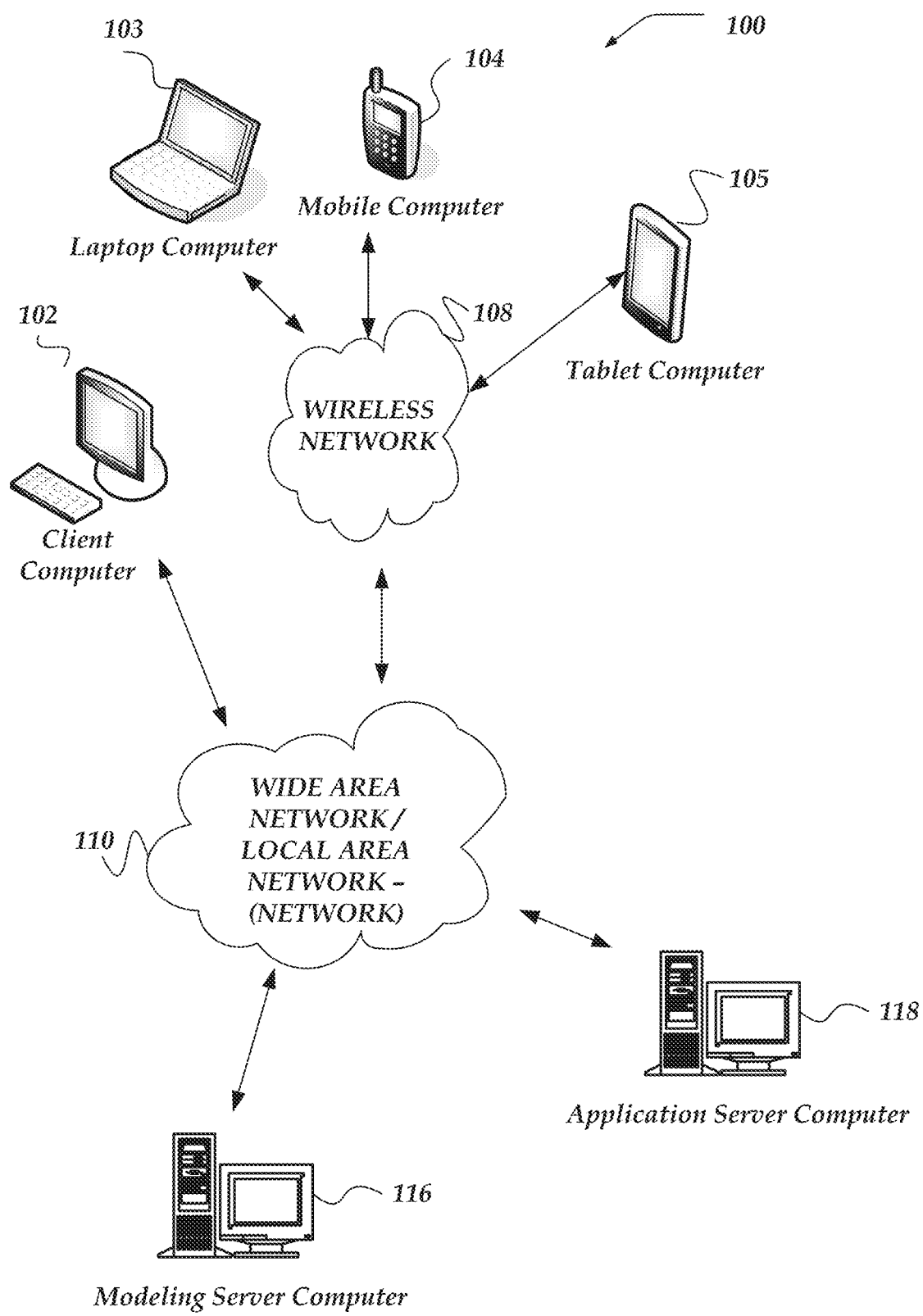
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, JavaScript, Ruby, VBScript, Microsoft .NET™ languages such as C #, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein the term "data source" refers to the source of the underlying information that is being modeled or otherwise analyzed. Data sources may include information from or provided by databases (e.g., relational, graph-based, no-sql, or the like), file systems, unstructured data, streams, or the like. Data sources are typically arranged to model, record, or memorialize various operations or activities associated with an organization. In some cases, data sources are arranged to provide or facilitate various data-focused actions, such as, efficient storage, queries, indexing, data exchange, search, updates, or the like. Generally, a data source may be arranged to provide features related to data manipulation or data management rather than providing an easy to understand presentation or visualization of the data.

As used herein the term "data model" refers to one or more data structures that provide a representation of an underlying data source. In some cases, data models may provide views of a data source for particular applications. Data models may be considered views or interfaces to the underlying data source. In some cases, data models may map directly to a data source (e.g., practically a logical pass through). Also, in some cases, data models may be provided by a data source. In some circumstances, data models may be considered interfaces to data sources. Data models enable organizations to organize or present information from data sources in ways that may be more convenient, more meaningful (e.g, easier to reason about), safer, or the like.

As used herein, the term "data model field" refers to named or nameable properties or features of a data model. Data model fields are analogous to columns in a database tables, nodes in a graph, Java class attributes, and so on. For example, a data model that corresponds to an employee database table, may have data model fields, such as, name, email-address, telephone-number, employee-id, or the like.

As used herein the term "data object" refers to one or more entities or data structures that comprise data models. In some cases, data objects may be considered portions of the data model. Data objects may represent individual instances of items or classes or kinds of items.

As used herein the term "panel" refers to region within a graphical user interface (GUI) that has a defined geometry (e.g., x, y, z-order) within the GUI. Panels may be arranged to display information to users or to host one or more interactive controls. The geometry or styles associated with panels may be defined using configuration information, including dynamic rules. Also, in some cases, users may be enabled to perform actions on one or more panels, such as, moving, showing, hiding, re-sizing, re-ordering, or the like.

As used herein the term "configuration information" refers to information that may include rule based policies, pattern matching, scripts (e.g., computer readable instructions), or the like, that may be provided from various sources, including, configuration files, databases, user input, built-in defaults, or the like, or combination thereof.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to managing data models using one or more processors that execute one or more instructions to perform as described herein.

In one or more of the various embodiments, a data source that includes one or more records may be provided such that one or more portions of the data source may be denormalized.

In one or more of the various embodiments, one or more source fields may be determined based on the one or more records such that the one or more source fields are displayed in a source panel on a user interface (UI).

In one or more of the various embodiments, a data model that includes at least one source data object that is based on the one or more source fields may be displayed.

In one or more of the various embodiments, one or more relationships between the one or more source fields may be determined based on one or more values in the one or more records such that each relationship includes a key field and one or more data fields, and such that each of the key fields and the one or more data fields for different relationships correspond to different source fields. In one or more of the various embodiments, determining the one or more relationships may include: employing one or more evaluators to identify one or more redundant fields in the one or more records; determining a portion of the one or more relationships based on the one or more redundant fields; or the like. In some embodiments, determining the one or more relationships may include: associating a confidence score with each of the one or more relationships such that the confidence score may be determined based on a strength of the one or more relationships; employing the confidence score to rank order the one or more relationships; omitting a portion of the one or more relationships from the relationship panel such that the score associated with of the omitted portion of the one or more relationships is less than a threshold value; or the like.

In one or more of the various embodiments, the one or more relationships may be displayed in a relationship panel.

In one or more of the various embodiments, in response to providing a relationship between the one or more source fields from the relationship panel further actions may be performed, including: determining a provided key field and one or more provided data fields based on the provided relationship; generating a data object that includes another key field and one or more other data fields such that the other key field corresponds to the provided key field and the one or more other data fields correspond to the one or more provided data fields; or the like.

In one or more of the various embodiments, the data model may be modified to include the data object and to remove the one or more source fields that correspond to the one or more other data fields such that modified data model is displayed to a user.

In one or more of the various embodiments, one or more conflicts in the data model or the modified data model may be determined based on one or more of the selected key fields or the one or more selected data fields being included in a data object in the data model or in the modified data model; an appearance of the data model or the modified data model may be modified to indicate the presence of the one or more conflicts.

In one or more of the various embodiments, the one or more records may be determined based on sampling the data source such that the one or more records are representative of the data source.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)—(network) 110, wireless network 108, client computers 102-105, modeling server computer 116, application server computer 118, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CSS), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, modeling server computer 116, application server computer 118, or other computers.

Client computers 102-105 may further be configured to include a client application that enables an end-user to log into an end-user account that may be managed by another computer, such as modeling server computer 116, application server computer 118, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Also, client computers may be arranged to enable users to display reports, interactive user-interfaces, or results provided by modeling server computer 116, application server computer 118, or the like.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, modeling server computer 116, application server computer 118, client computers 102, and client computers 103-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

Also, one embodiment of modeling server computer 116 is described in more detail below in conjunction with FIG. 3. Although FIG. 1 illustrates modeling server computer 116 or the like, as a single computer, the innovations or embodiments are not so limited. For example, one or more functions of visualization server computer 116, or the like, may be distributed across one or more distinct network computers. Moreover, in one or more embodiments, modeling server computer 116 may be implemented using a plurality of network computers. Further, in one or more of the various embodiments, modeling server computer 116, or the like, may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
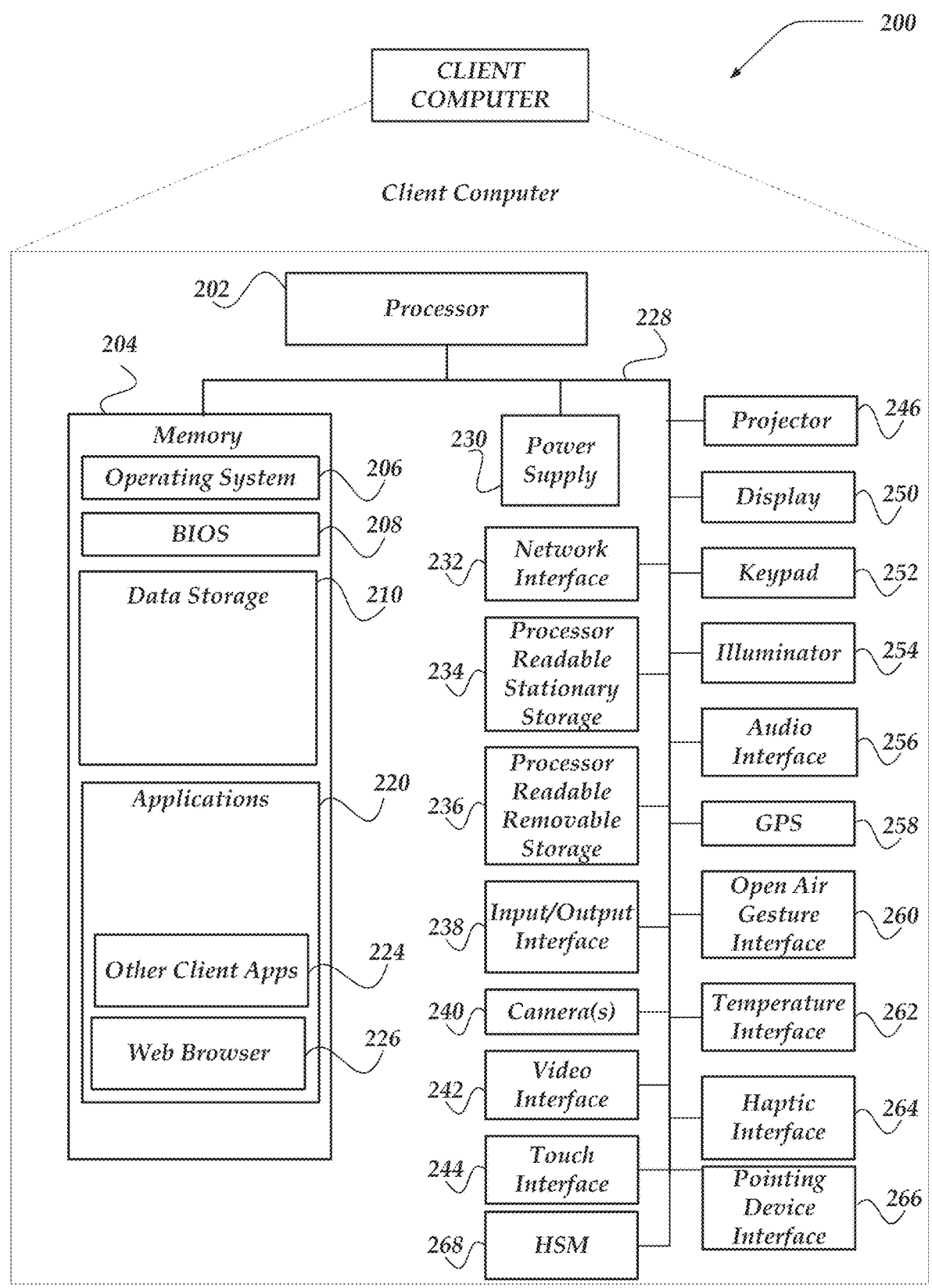
FIG. 2 illustrates a schematic embodiment of a client computer.

FIG. 2 shows one embodiment of client computer 200 that may include many more or less components than those shown. Client computer 200 may represent, for example, one or more embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (MC).

Audio interface 256 may be arranged to produce and receive audio signals such as the sound of a human voice. For example, audio interface 256 may be coupled to a speaker and microphone (not shown) to enable telecommunication with others or generate an audio acknowledgment for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may back-light the buttons on keypad 252 and stay on while the client computer is powered. Also, illuminator 254 may back-light these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiments, however, client computer 200 may, through other components, provide other information that may be employed to determine a physical location of the client computer, including for example, a Media Access Control (MAC) address, IP address, and the like.

In at least one of the various embodiments, applications, such as, operating system 206, other client apps 224, web browser 226, or the like, may be arranged to employ geo-location information to select one or more localization features, such as, time zones, languages, currencies, calendar formatting, or the like. Localization features may be used in display objects, data models, data objects, user-interfaces, reports, as well as internal processes or databases. In at least one of the various embodiments, geo-location information used for selecting localization information may be provided by GPS 258. Also, in some embodiments, geolocation information may include information provided using one or more geolocation protocols over the networks, such as, wireless network 108 or network 111.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiments, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or LINUX™, or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, other client applications 224, web browser 226, or the like. Client computers may be arranged to exchange communications one or more servers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, visualization applications, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), client computer 200 may include one or more hardware micro-controllers instead of CPUs. In one or more embodiments, the one or more micro-controllers may directly execute their own embedded logic to perform actions and access its own internal memory and its own external Input and Output Interfaces (e.g., hardware pins or wireless transceivers) to perform actions, such as System On a Chip (SOC), or the like.

Illustrative Network Computer

Figure 3:
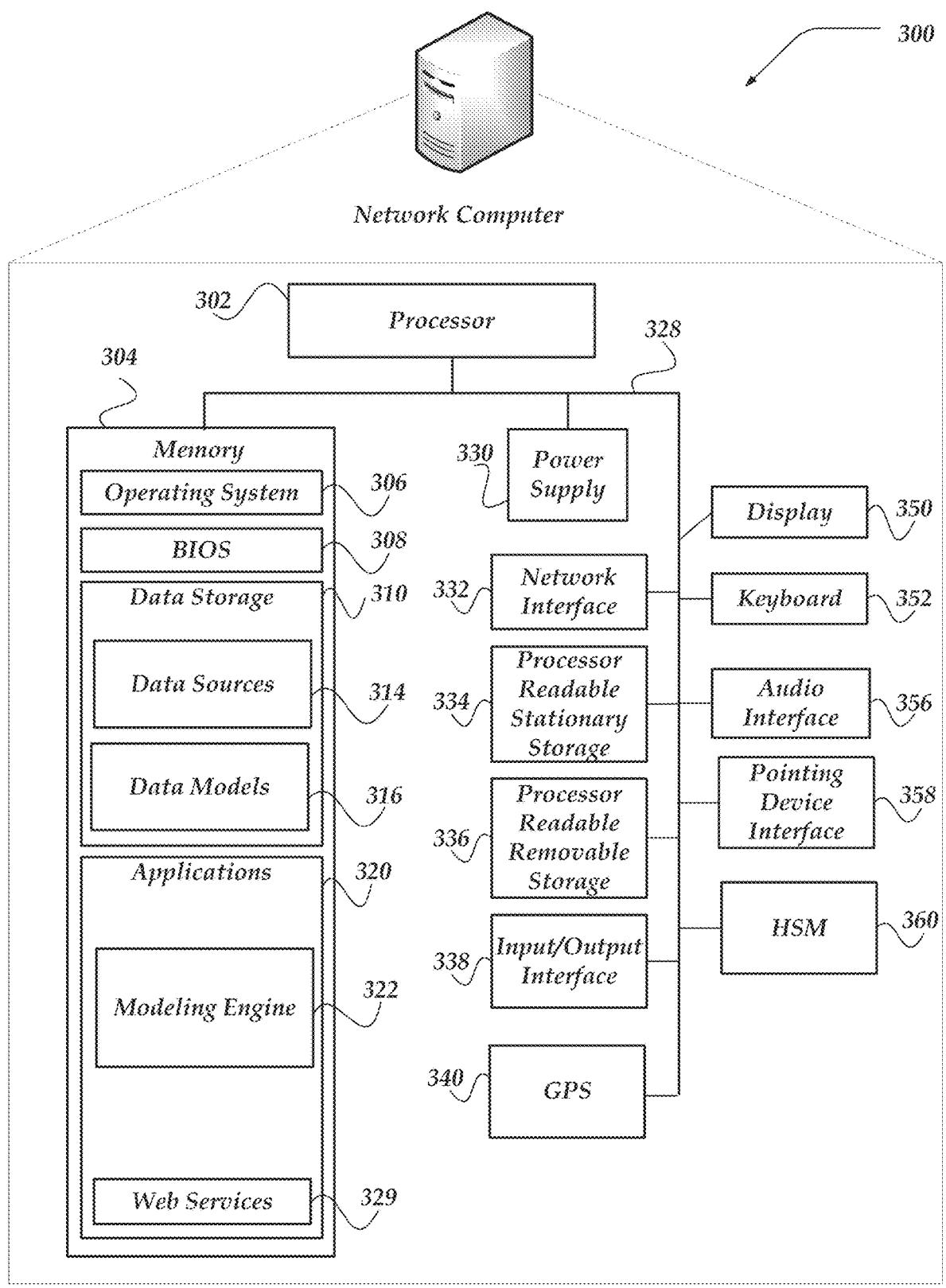
FIG. 3 illustrates a schematic embodiment of a network computer.

FIG. 3 shows one embodiment of network computer 300 that may be included in a system implementing one or more of the various embodiments. Network computer 300 may include many more or less components than those shown in FIG. 3. However, the components shown are sufficient to disclose an illustrative embodiment for practicing these innovations. Network computer 300 may represent, for example, one embodiment of at least one of event analysis server computer 116, or the like, of FIG. 1.

Network computers, such as, network computer 300 may include a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgment for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiments, however, network computer 300 may, through other components, provide other information that may be employed to determine a physical location of the client computer, including for example, a Media Access Control (MAC) address, IP address, and the like.

In at least one of the various embodiments, applications, such as, operating system 306, modeling engine 322, other applications 329, or the like, may be arranged to employ geo-location information to select one or more localization features, such as, time zones, languages, currencies, currency formatting, calendar formatting, or the like. Localization features may be used in user interfaces, dashboards, visualizations, reports, as well as internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or LINUX™, or a specialized operating system such as Microsoft Corporation's Windows® operating system, or the Apple Corporation's OSX® operating system. The operating system may include, or interface with one or more virtual machine modules, such as, a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, data sources 314, data models 316, or the like.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include modeling engine 322, other applications 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, modeling engine 322, other applications 329, other applications 329, or the like, may be operative in a cloud-based computing environment. In one or more of the various embodiments, these applications, and others, that comprise the management platform may be executing within virtual machines or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to modeling engine 322, other applications 329, or the like, may be provisioned and de-commissioned automatically.

Also, in one or more of the various embodiments, modeling engine 322, other applications 329, or the like, may be located in virtual servers running in a cloud-based computing environment rather than being tied to one or more specific physical network computers.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of a CPU. In one or more embodiments, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
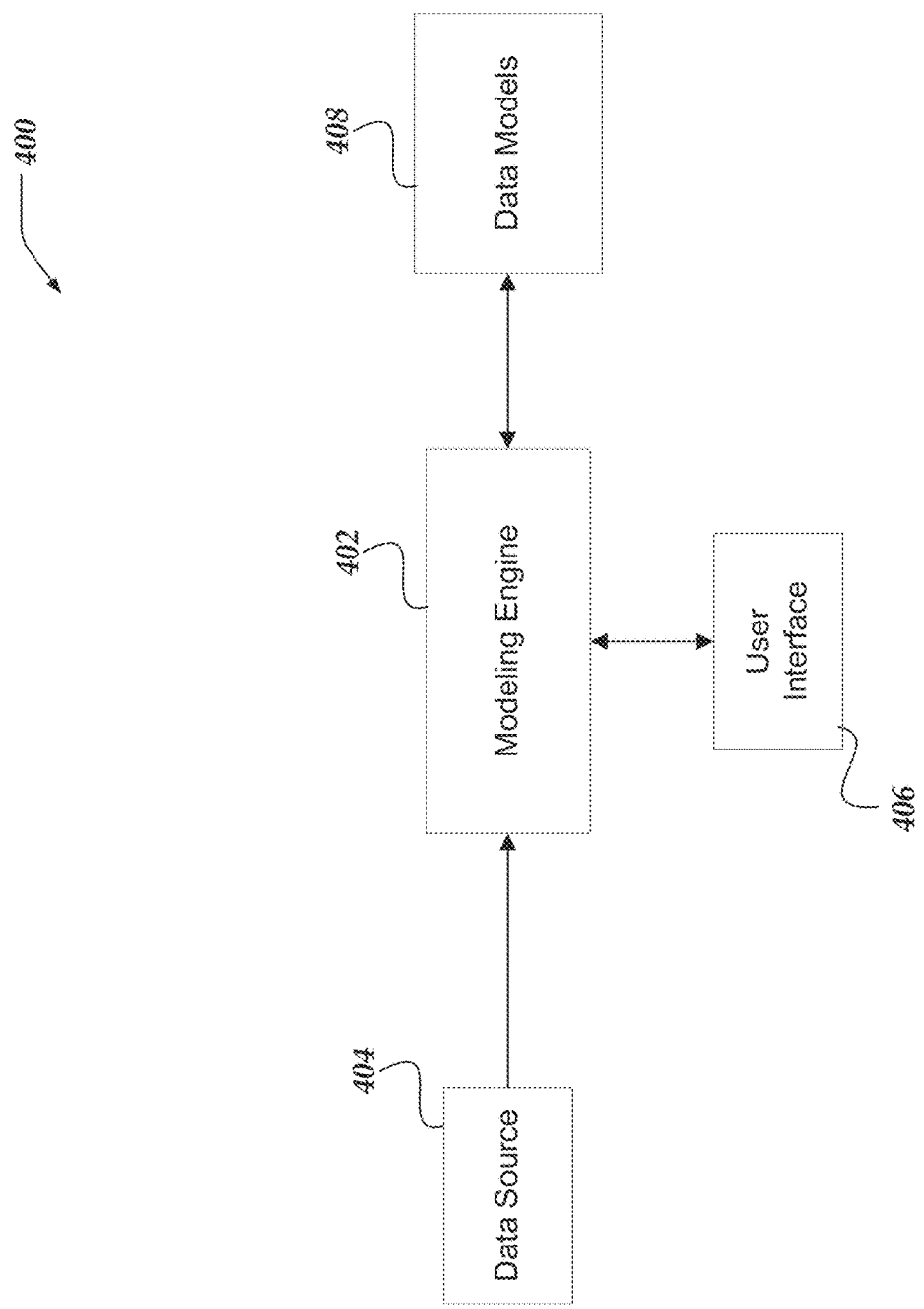
FIG. 4 illustrates a logical architecture of a system for interactive data modeling in accordance with one or more of the various embodiments.

FIG. 4 illustrates a logical architecture of system 400 for interactive data modeling in accordance with one or more of the various embodiments. In one or more of the various embodiments, system 400 may be a data modeling platform arranged to include various components including: modeling engine 402; one or more data sources, such as, data source 404; one or more user interfaces, such as, user interface 406; one or more data models, such as, data models 408; or the like.

Also, in one or more of the various embodiments, client computers, other applications, services, or the like, may provide user interfaces that enable users to interact with data sources or data models. In this example, user interface 406 represents the various user interfaces that may enable users to interact with data models.

In one or more of the various embodiments, data source 404 represent a source of raw data, records, data items, or the like, that modeling engine 402 may be arranged to enable users to generate or modify data models, such as, data models 408.

In one or more of the various embodiments, data models, such as, data model 408 may be data structures, or the like, that provide one or more logical representations of the information stored in one or more data sources, such as, data source 404. In some embodiments, data models may include data objects that correspond to fields or attributes in a data source. For example, in some embodiments, if data source 404 is a CSV file, a data model, such as, data model 404 may be comprised of one or more data objects that may correspond to record fields in data source 404.

In one or more of the various embodiments, data models may be arranged to provide views or representations of a data source that may vary from an underlying data source. In some embodiments, this may include excluding one or more fields in the data source from the data model.

In some embodiments, a modeling engine, such as, modeling engine 402 may be employed to transform some or all of data source 404 into data model 408. In some embodiments, the modeling engine may be arranged to employ or execute computer readable instructions provided by configuration information to determine some or all of the steps for transforming values in data sources into data models.

In one or more of the various embodiments, data sources may be comprised of denormalized data. There may be various reasons that data sources provide denormalized data. For example, the data source may be based on data exported from a database, application, or service that employs denormalized data models. Likewise, in some embodiments, data sources that support normalization of data may include deliberately denormalized data.

In one or more of the various embodiments, denormalized data sources may include numerous redundancies that may be better reasoned about or managed using normalized data. Accordingly, in one or more of the various embodiments, modeling engines, such as, modeling engine 402 may be arranged to enable normalized data models to be generated from denormalized data sources.

In one or more of the various embodiments, modeling engines may be arranged to enable users to explore the many possible data models that can be built for an underlying data in a data source based on some subset of the exposed relationships. Also, in some embodiments, modeling engines may be arranged to enable users to understand how some relationships conflict with others, and how to reason about the trade-offs.

For example, in some embodiments, a user may be enabled to view one or more discovered relationships and select the relationships to include in the resulting data model. Further, in some embodiments, modeling engines may be arranged to enable users to individually enable/disable one or more portions of each relationship.

In one or more of the various embodiments, the user interface may display a visualization to demonstrate how the data model will change with each user action. In some embodiments, the user interface also allows users to make selections that conflict with the existing data model. In such cases, the modeling platform implicitly removes the existing conflicting relationships (or the conflicting parts, in the event of a partial conflict). Accordingly, in some embodiments, if previewing such a change, the user's direct changes are styled to appear differently than the modeling platform's conflict-resolving changes. For example, the changes proposed by a user may be displayed using the color green while the conflicts determined by the modeling platform may be displayed using the color red. Thus, in some embodiments, the previews generating by the modeling engine may ease the user's understanding of how the data model will change if adding or removing different data objects.

Accordingly, in one or more of the various embodiments, modeling engines may be arranged to automatically discover and expose relationships between fields (or columns) in a denormalized data source. In some embodiments, each discovered relationship may be part of an implicit underlying data model or may be spurious or useless, but presumably some collection of these relationships may organize the underlying denormalized data source into an improved normalized data model. However, in some embodiments, some discovered relationships may conflict with each other either in part or in whole, so to construct a data model, the modeling engine or a user may make determinations to select the relationships to include in the data model and which ones to discard.

Figure 5:
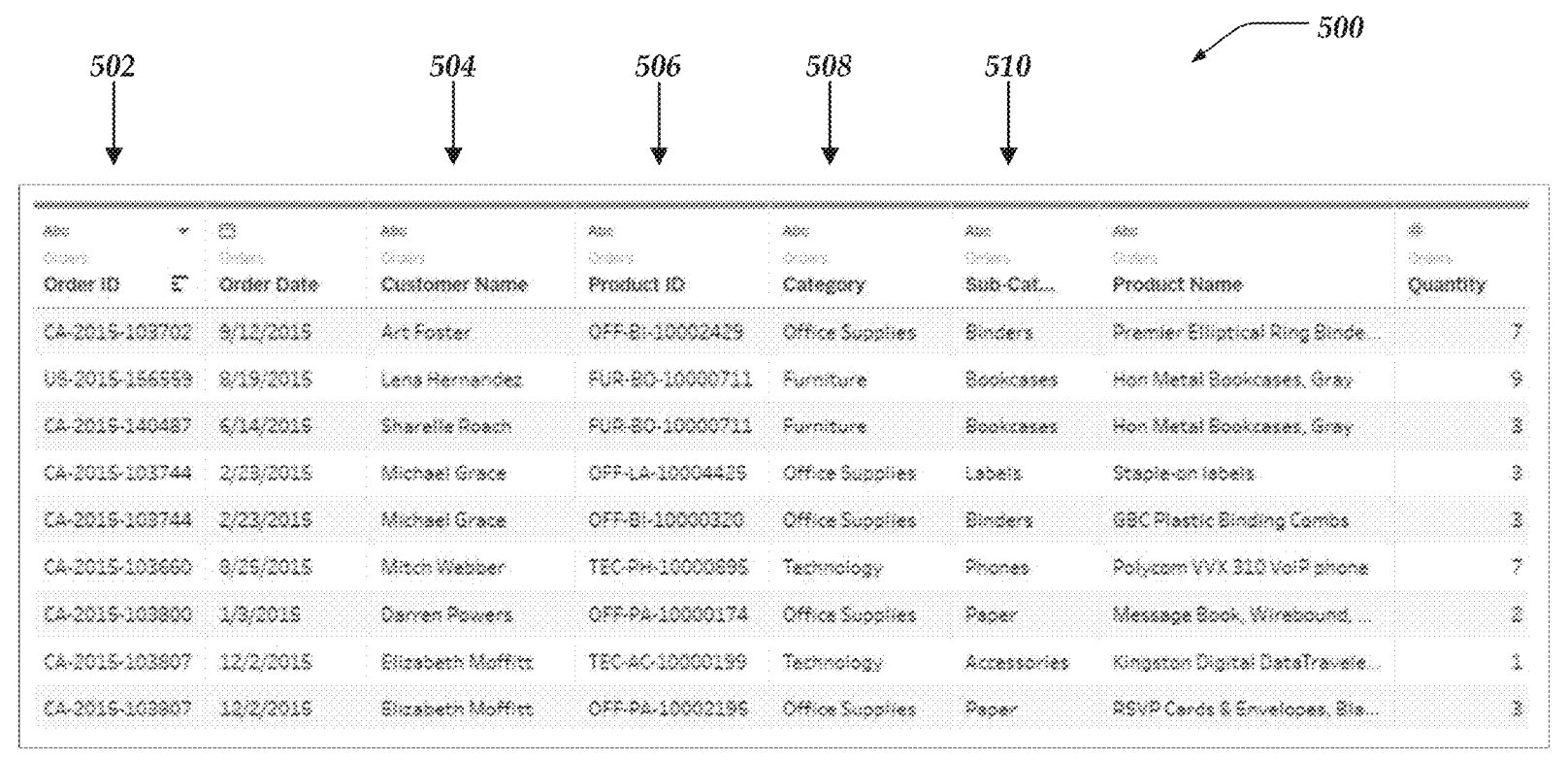

FIG. 5 illustrates a logical schematic of data source 500 for interactive data modeling in accordance with one or more of the various embodiments. In this example, data source 500 represents a denormalized data table. In some embodiments, data source 500 may be a flat file (e.g., CSV files, fixed-width column files, or the like), a denormalized database table (e.g., NoSQL databases), or the like.

In this example, data source 500 represents information associated with product orders for customers. In this example, each record in data source 500 represents an order item from orders that may include one or more order items.

In this example, data source 500 may be considered denormalized at least because each record that has a given "Product ID" (column 506) value has the same "Category" (column 508) and "Sub-Category" (column 510) values duplicated in each record. Likewise, in this example, each record that has a given "Customer Name" (column 504) value also has the same "Order ID" (column 502) duplicated in each record.

For some applications, denormalized data sources such as data source 500 may be advantageous for various reasons, such as, simplicity, performance, or the like. However, in some embodiments, denormalized data sources such as data source 500 may be disadvantageous for analysis or reasoning related to the different data objects that may be embedded in the denormalized records. This difficulty may be at least because the relationships between data objects may be obscured or otherwise difficult to analyze using conventional data analysis tools.

Figure 6A:
FIG. 6A illustrates a logical representation of a portion of a user interface for interactive data modeling in accordance with one or more of the various embodiments.

FIG. 6A illustrates a logical representation of a portion of user interface 600 for interactive data modeling in accordance with one or more of the various embodiments. In some embodiments, user interface 500 may be arranged to provide a graphical canvas, such as, canvas 602 that may include one or more panels, such as, source panel 604, relationship panel 608, or the like.

In one or more of the various embodiments, user interface 600 may be displayed on one or more hardware displays, such as, client computer displays, mobile device displays, or the like. In some embodiments, user interface 600 may be provided via a native application or as a web application hosted in a web browser or other similar applications. One of ordinary skill in the art will appreciate that for at least clarity or brevity many details common to commercial/production user interfaces have been omitted from user interface 600. Likewise, in some embodiments, user interfaces may be arranged differently than shown depending on local circumstances or local requirements. However, one of ordinary skill in the art will appreciate that the disclosure/description of user interface 600 is at least sufficient for disclosing the innovations included herein.

In some embodiments, source panels, such as, source panel 604, may be employed to display at least a portion data objects that may be included in a data source. In this example, the listed items represent data objects available for interactive data modeling. Accordingly, in one or more of the various embodiments, the data objects displayed in source panel 604 may be objects that a modeling engine automatically discovers in the data source. For example, if the data source is a CSV file with a record that includes the names of the fields, those names may be assumed to be data objects. In some embodiments, the particular data objects shown in a source panel may be determined based on configuration information that that may identify portions of data sources that may be available for display in source panels.

As mentioned above, in one or more of the various embodiments, modeling engines may be arranged to automatically analyze the data source to identify one or more candidate relationships that may be suitable for modeling in a data model. In some embodiments, relationship panels may comprise a list of data objects that may have a relationship. In some embodiments, the data objects may be grouped such that a candidate key object may be shown with the related objects. In this example, relationship 610, relationship 612, relationship 614 represent a portion of the relationships that a modeling engine may determine from data sources, such as, data source 500.

In one or more of the various embodiments, each relationship in relationship panel 608 may indicate relationships that may be included in a data model. In some embodiments, the relationships in display panels may be sorted based on the confidence score or match score that represents a strength of the assertion that a particular relationship may be added to a data model.

In one or more of the various embodiments, modeling engines may be arranged to execute one or more actions to identify candidate relationships. Accordingly, in one or more of the various embodiments, one or more of the actions may be associated with a higher likelihood that a relationship should be modeled. In one or more of the various embodiments, modeling engines may be arranged to employ rules, instructions, matching models, or the like, provided or selected via configuration information to account for local circumstances or local requirements. For example, in some embodiments, an organization may include a list of candidate relationships to automatically exclude or de-rank based on their particular needs.

Figure 6B:
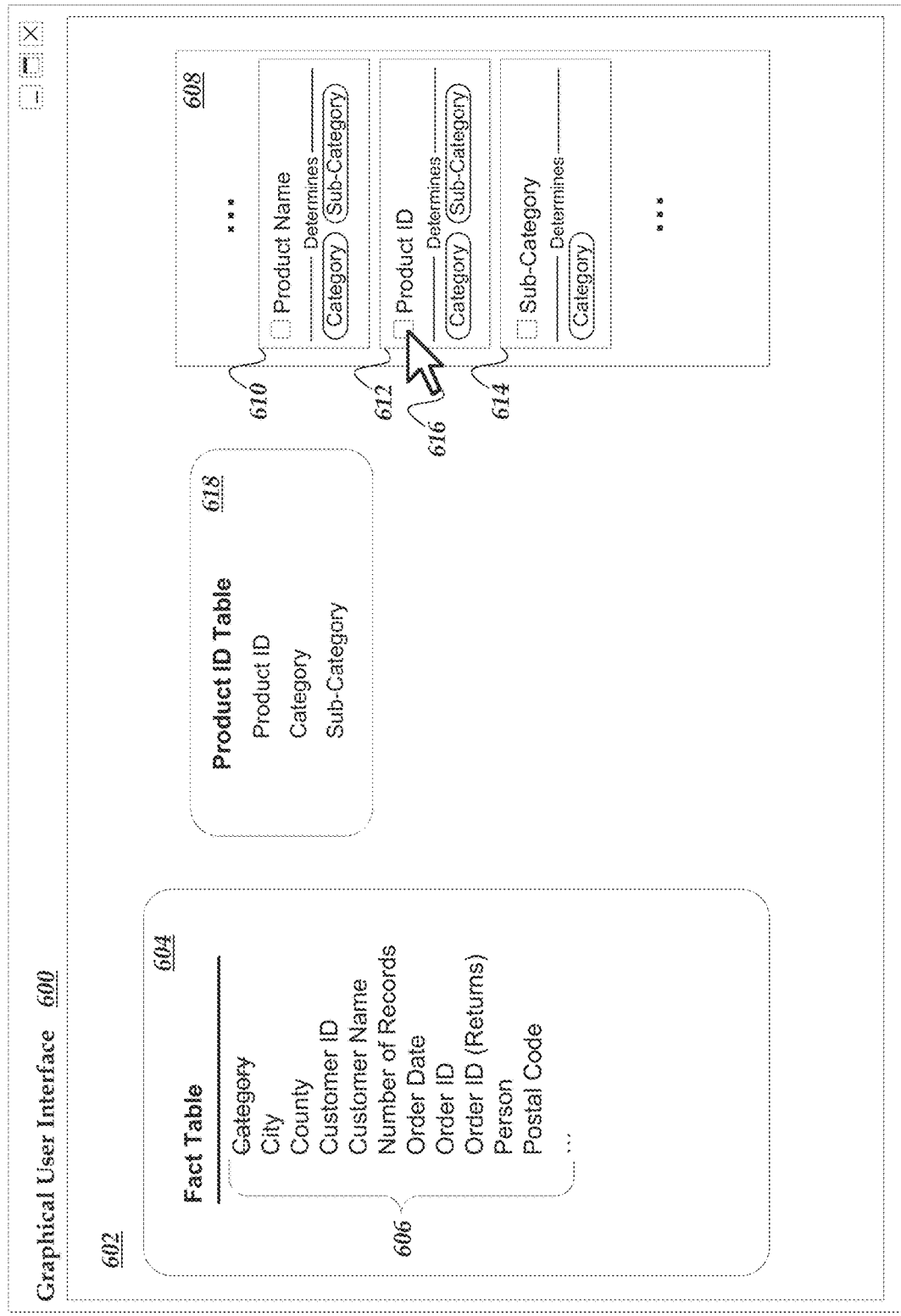
FIG. 6B illustrates a logical representation of a portion of a user interface for interactive data modeling in accordance with one or more of the various embodiments.

FIG. 6B illustrates a logical representation of a portion of user interface 600 for interactive data modeling in accordance with one or more of the various embodiments. For brevity and clarity, elements or behaviors of user interface 600 described above for FIG. 6A are not repeated here.

In this example, a user may be considered to be hovering mouse pointer 616 over candidate relationship 612. Accordingly, in one or more of the various embodiments, a modeling engine (not shown) may be arranged to generate model panel 618 that displays how a data model would appear if relationship 612 is added to the data model. In some embodiments, modeling engines may be arranged to indicate which data objects may be removed from original data object by (in this example) striking out the data fields that may be included in the proposed data object. Accordingly, in this example, Product ID, Category, and Sub-Category are shown as attributes of a Product (ID) object.

Accordingly, modeling engines may enable users to review the proposed change to the data model by hovering over the various relationships displayed in relationship panel 608.

Figure 6C:
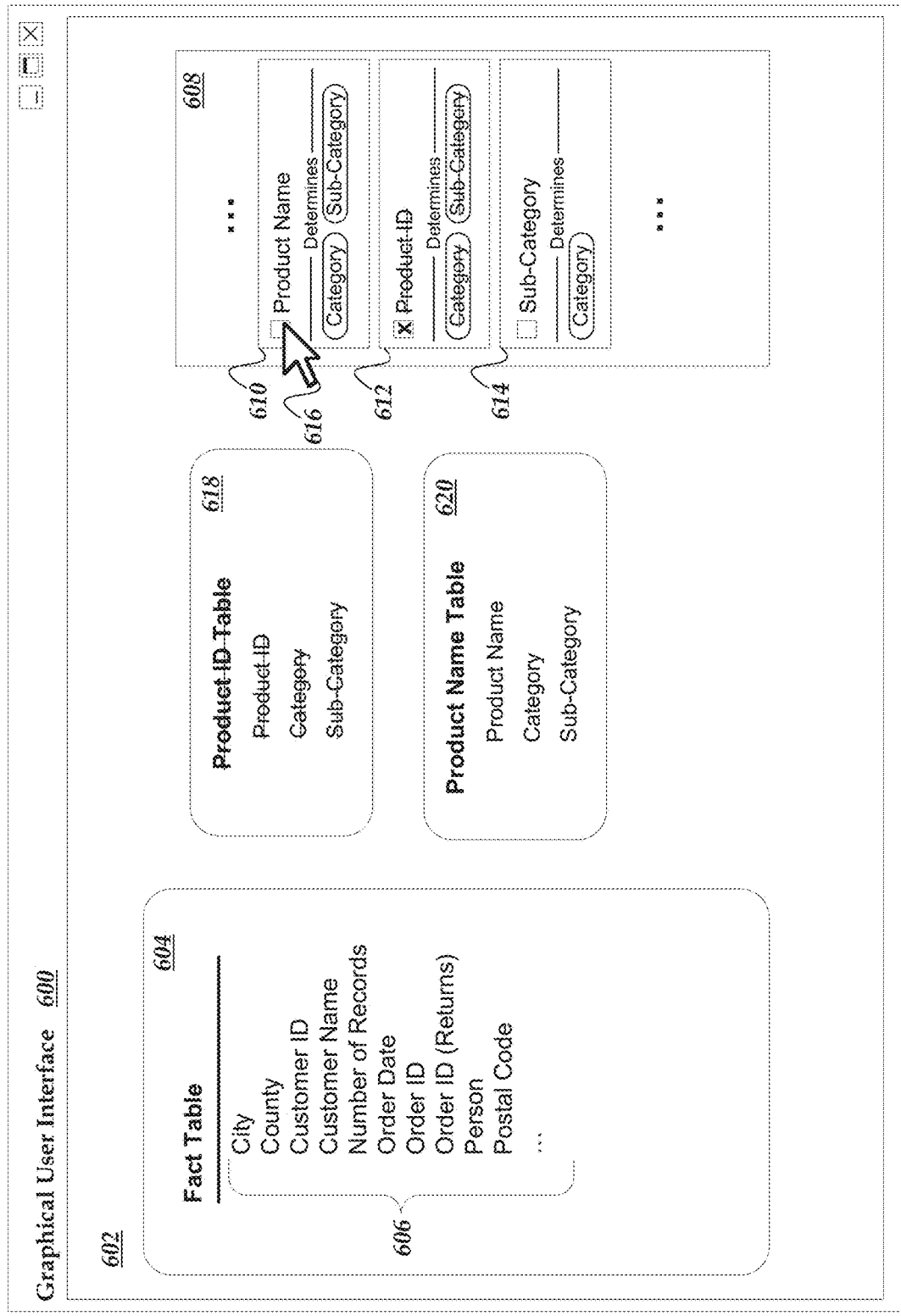
FIG. 6C illustrates a logical representation of a portion of a user interface for interactive data modeling in accordance with one or more of the various embodiments.

FIG. 6C illustrates a logical representation of a portion of user interface 600 for interactive data modeling in accordance with one or more of the various embodiments. For brevity and clarity, elements or behaviors of user interface 600 described above for FIG. 6A and FIG. 6B are not repeated here.

In one or more of the various embodiments, modeling engines may be arranged to enable users to propose candidate relationships that may conflict with one or more data objects in the data model. Accordingly, in some embodiments, modeling engines may be arranged to markup existing data objects or data fields that may be in conflict with proposed changes. In this example, candidate data object 620 based on relationship 610 introduces a conflict in the data model because it included two of the same data fields as data object 618. In this example, data object 618 marked up by strike-through notation. Likewise, in this example, relationship 612 is also marked up by strike-through notation to indicate that it would be removed from the data model if data object 620 may be added to the data model.

Generalized Operations

Figure 7:
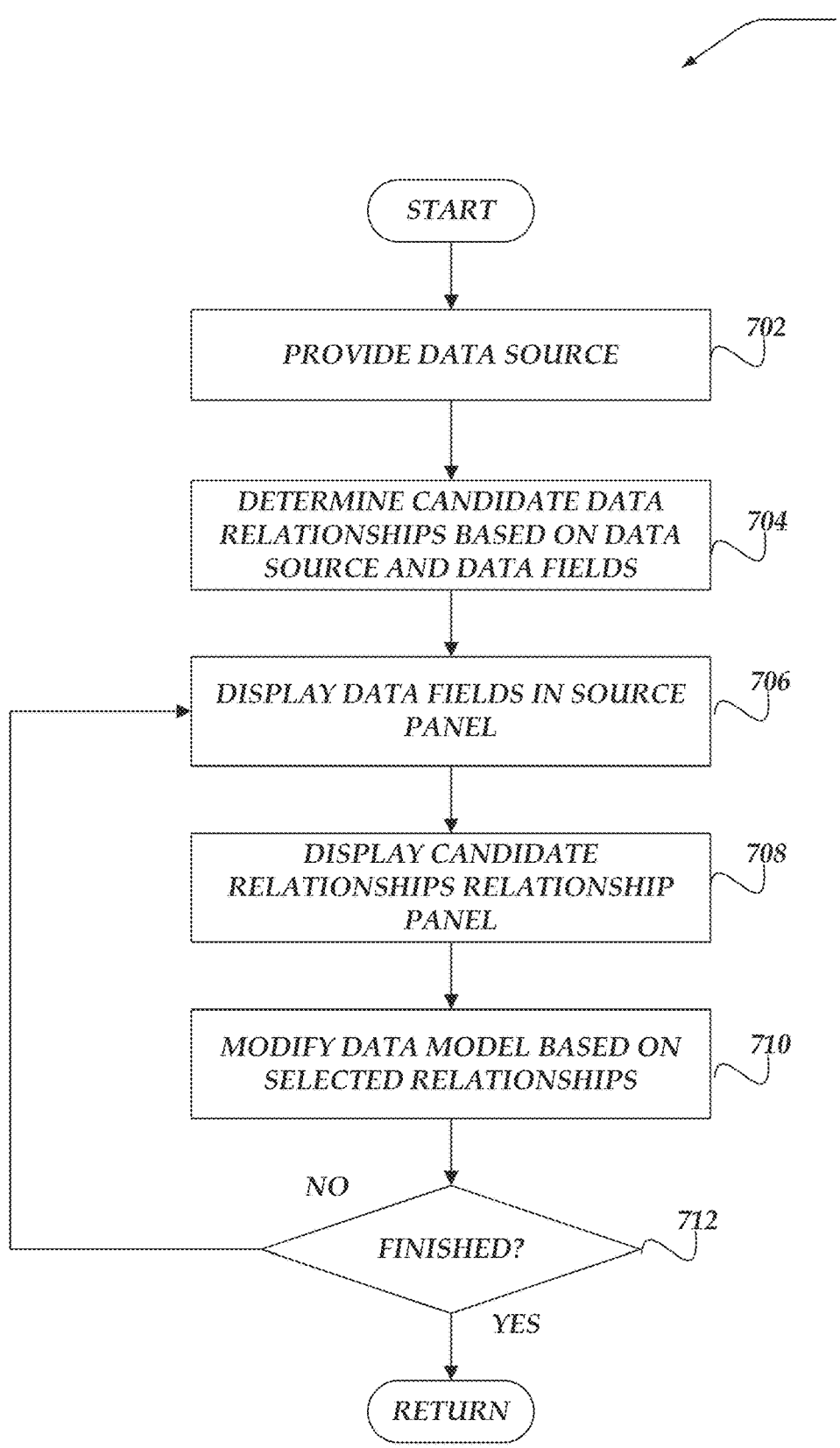
FIG. 7 illustrates an overview flowchart of a process for interactive data modeling in accordance with one or more of the various embodiments.
Figure 8:
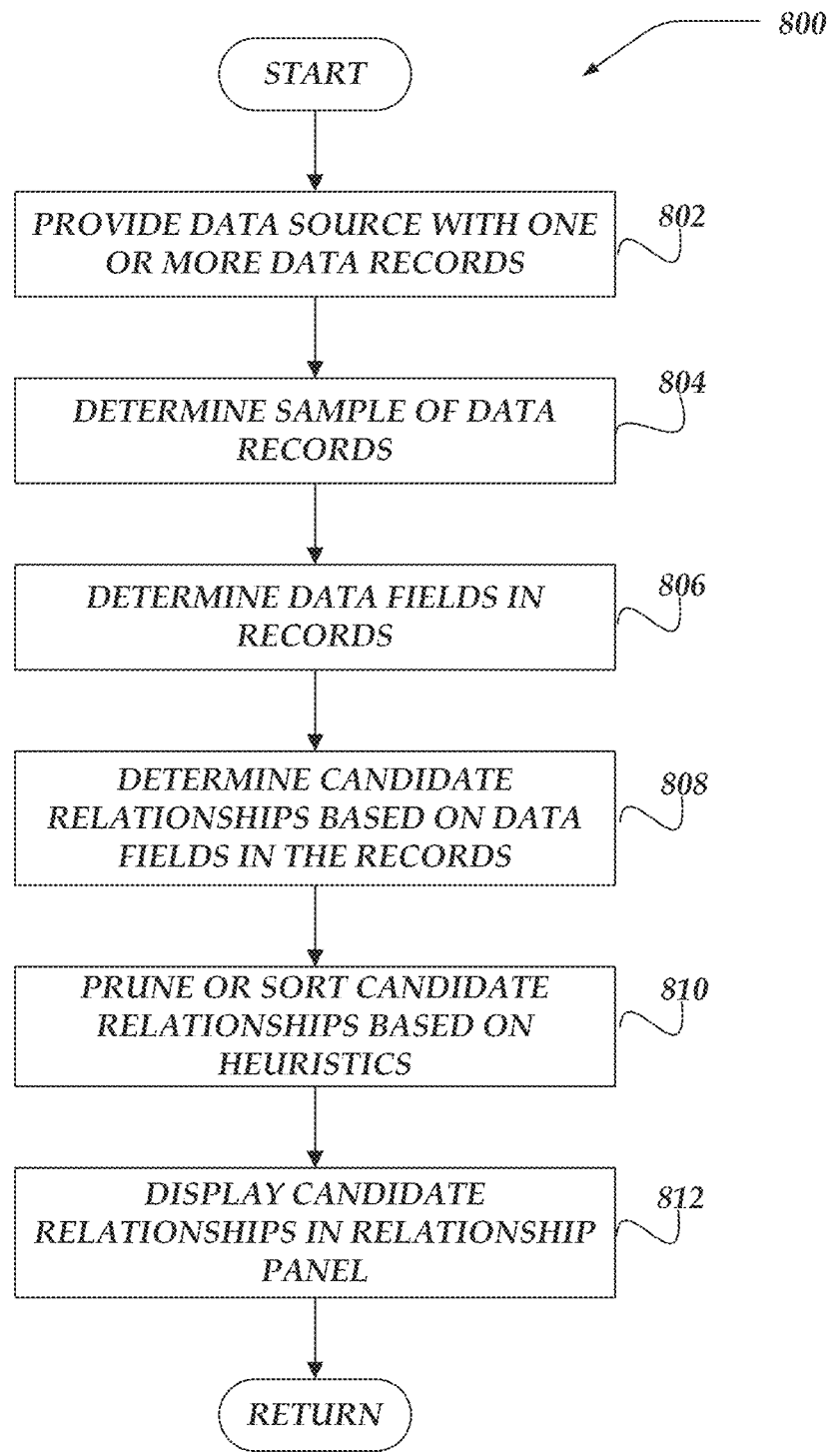
FIG. 8 illustrates a flowchart of a process for interactive data modeling in accordance with one or more of the various embodiments.
Figure 9:
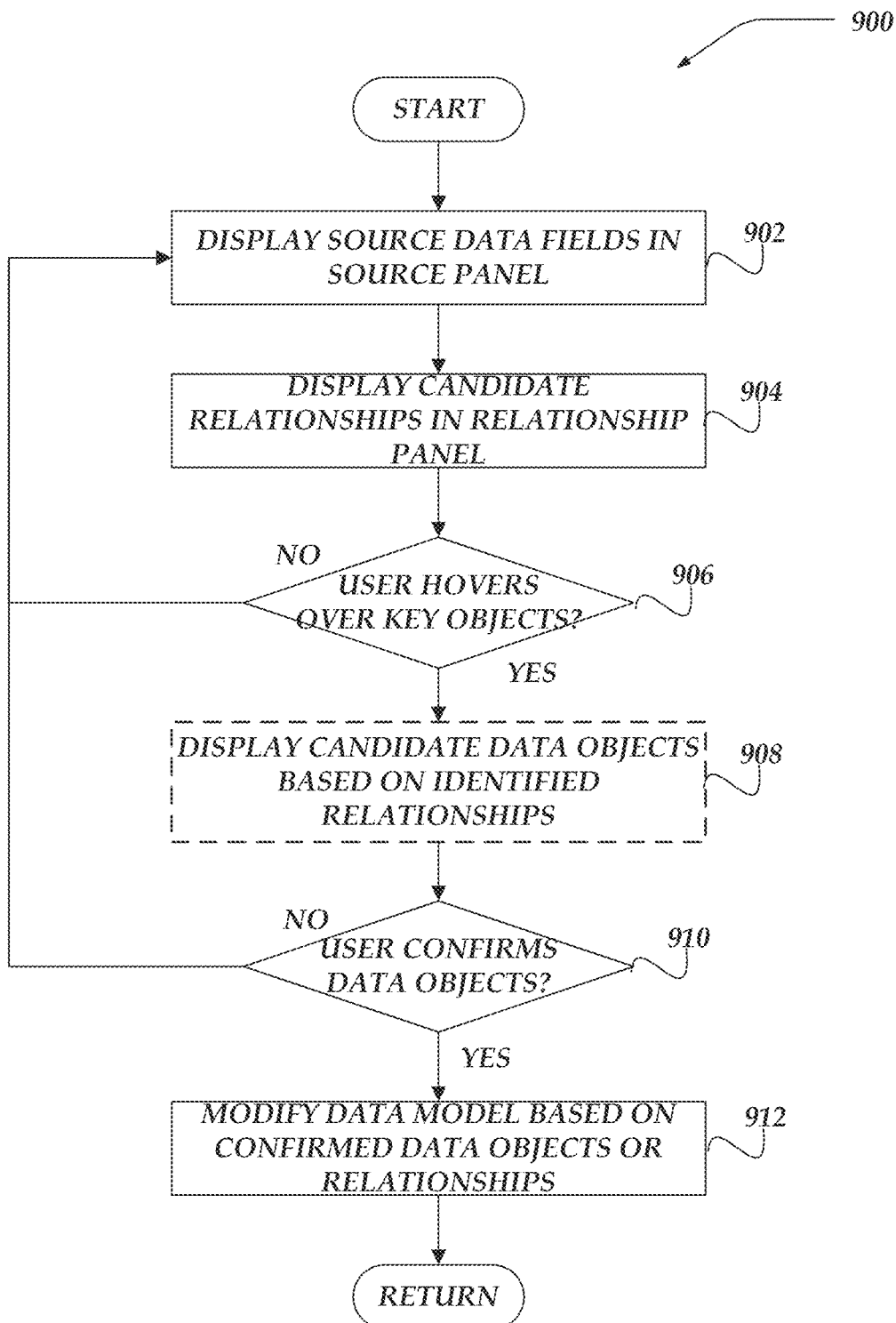
FIG. 9 illustrates a flowchart of a process for interactive data modeling in accordance with one or more of the various embodiments.

FIGS. 7-9 represent generalized operations for interactive data modeling in accordance with one or more of the various embodiments. In one or more of the various embodiments, processes 700, 800, and 900 described in conjunction with FIGS. 7-9 may be implemented by or executed by one or more processors on a single network computer, such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based environment. However, embodiments are not so limited and various combinations of network computers, client computers, or the like may be utilized. Further, in one or more of the various embodiments, the processes described in conjunction with FIGS. 7-9 may be used for interactive data modeling in accordance with at least one of the various embodiments or architectures such as those described in conjunction with FIGS. 4-6. Further, in one or more of the various embodiments, some or all of the actions performed by processes 700, 800, and 900 may be executed in part by event analysis engine 322 running on one or more processors of one or more network computers.

FIG. 7 illustrates an overview flowchart of process 700 for interactive data modeling in accordance with one or more of the various embodiments. After a start block, at start block 702, in one or more of the various embodiments, a data source may be provided to a modeling engine.

At block 704, in one or more of the various embodiments, the modeling engine may be arranged to determine one or more candidate data relationships based on the data source and the data fields in the data source. In one or more of the various embodiments, modeling engines may be arranged to employ various evaluators to identify one or more candidate relationships that may be embedded in the data records of the data source. In one or more of the various embodiments, the particular evaluators or their actions may be determined from configuration information to account for local requirements or local circumstances.

At block 706, in one or more of the various embodiments, the modeling engine may be arranged to display the one or more data fields in a source panel. In one or more of the various embodiments, data sources may include one or more columns or column-like structures. For example, is a data source is based on a CSV file, each field in each record may be considered a column. In some embodiments, data sources may include header information that may provide labels for the different columns (or record fields). In some embodiments, modeling engines may be arranged to enable users or configuration information to provide labels for the columns/fields in the data source.

In one or more of the various embodiments, the labels associated with each record field may be inferred to be data field names that may be displayed in the source panel. In some embodiments, the source panel may be considered to be displaying a single data object that has data fields that correspond to each record field (or column) in the data source.

At block 708, in one or more of the various embodiments, the modeling engine may be arranged to display one or more candidate relationships in a relationship panel. In one or more of the various embodiments, modeling engines may display some or all of the determined candidate relationships in a relationship panel that enables users to view the relationships. In some embodiments, relationship panels may be configured to enable users to select or de-select one or more candidate relationships to include in a data model based on the data source.

At block 710, in one or more of the various embodiments, the modeling engine may be arranged to modify the data model based on the selected relationships. In one or more of the various embodiments, as candidate relationships may be converted into data objects, the modeling engine may be arranged to modify the data model associated with the data source accordingly. In some embodiments, modeling engines may be arranged to display a visualization of the data model that may be changed in real-time to reflect the changes made to the data model.

At decision block 712, in one or more of the various embodiments, if the interactions with the data model may be complete, control may be returned to a calling process; otherwise, control may loop back to block 706. In one or more of the various embodiments, modeling engines enable users to interactively explore how the candidate relationships may impact a data model. Accordingly, in some embodiments, users may select or de-select candidate relationships several times during a session. In some embodiments, modeling engines may be arranged to enable users to store the data model to data store at the completion of a session or on demand.

Next, in one or more of the various embodiments, control may be returned to a calling process.

FIG. 8 illustrates a flowchart of process 800 for interactive data modeling in accordance with one or more of the various embodiments. After a start block, at start block 802, in one or more of the various embodiments, a data source with one or more data records may be provided to a modeling engine. In one or more of the various embodiments, modeling engines may be configured to automatically discover one or more data sources. Also, in some embodiments, modeling engines may be arranged to enable users to interactively select one or more data sources. Accordingly, in some embodiments, modeling engines may be arranged to employ configuration information to determine the particular data source that may be provided.

At block 804, in one or more of the various embodiments the modeling engine determine a sample set of data records from the data source. In some embodiments, modeling engines may be arranged to evaluate all the of records in the data source. In other cases, for some embodiments, the number of records may exceed a threshold value that indicates a portion of the records should evaluated rather than all of them. Accordingly, in some embodiments, modeling engines may be arranged to determine the threshold number of records that may trigger sampling a portion of the records based on configuration information. Likewise, in some embodiments, modeling engines may be arranged to determine the number of samples or the sampling methods based on configuration information to account for local requirements or local circumstances.

In one or more of the various embodiments, modeling engines may be arranged to employ database APIs, file system I/O, or the like, to access the one or more records. In some embodiments, modeling engines may be arranged to access one or more portions of the records at a time rather than being provided all of the records.

At block 806, in one or more of the various embodiments, the modeling engine may be arranged to determine one or more data fields from the data records. In some embodiments, data sources may be provided in a format that inherently enables individual or separate fields to in the data records to be determined. In some cases, for some embodiments, modeling engines may be required to perform additional actions to determine the individual fields in data records. Accordingly, in some embodiments, modeling engines may be arranged to employ rules, grammars, parsers, or the like, provided via configuration information to determine the individual fields in the data records. For example, in one or more of the various embodiments, if a file system provides files that may be the data source, the modeling engine may be arranged to automatically evaluate the files to identify fields separators (e.g., commas, tabs, or the like) that may be employed in files to determine the individual fields in the data records. Also, for example, modeling engines may enable users to provide input that may be employed to determine the field separators.

In one or more of the various embodiments, if the data source provides a conventional database-like API one or more of the fields may be inherently determined based on the queries executed by the modeling engine to obtain access to the records.

At block 808, in one or more of the various embodiments, the modeling engine may be arranged to determine one or more candidate relationships based on the records in the data source.

In one or more of the various embodiments, modeling engines may be arranged to employ a variety of strategies to determine candidate relations from the data records. In some embodiments, these strategies may be adapted or modified depending on one or more characteristics of given data source, such as, problem/industry domain, localization, the amount of the data, the size of the data records, or the like. Also, in some embodiments, modeling engines may be arranged to incorporate input or direct feedback or passive feedback from users to guide the evaluation strategies. Further, in some embodiments, modeling engines to employ machine learning, statistical analysis, ontological analysis, or the like, to evaluate data in the data sources.

One of ordinary skill in the art will appreciate that many different types of analysis may be employed to infer relationships from fields in the data records. However, for brevity and clarity, just a few examples are described below. However, one of ordinary skill in the art will appreciate that other conventional or custom techniques may be included without departing from scope of these innovations. In some embodiments, modeling engines may be arranged to employ rules, grammars, parsers, machine learning models/classifiers, or the like, that may be provided via configuration information to perform the evaluation of the data in the data source to account for local circumstances or local requirements.

In one or more of the various embodiments, modeling engines may be arranged to identify data fields that have the same values (duplicates) across multiple records based on direct comparisons. In some embodiments, if duplicate fields may be linked or associated with another field, those fields may be candidates for being associated with a relationship. For example, if data fields from one or more columns in a data source having low cardinality are associated with another column/field that has high cardinality, there may be a candidate relationship that should be identified. For example, a category field and sub-category field having low cardinality (or low entropy) that are associated with a product identifier field (Product ID) may indicate the existence of a relationship that should be represented in a data model. In this example, if each record that includes a particular Product ID has the same Category and Sub-Category field values, the inference may be made that a Product data object may be pulled out of the data source and included in a data model.

Likewise, for example, if each record includes different fields for street addresses, city names, state/province name, postal codes, or the like, the modeling engine may infer that this relationship may be of interest because it may represent that a data object for Address may be added to a data model.

Further, in one or more of the various embodiments, modeling engines may be arranged to employ pattern matching, heuristics, dictionaries, or the like, to classify field types to help identify relationships. For example, modeling engines may evaluate fields/columns to determine if they may be telephone numbers, street addresses, postal codes, GPS coordinates (e.g., latitude or longitude), email addresses, person names, business names, dates, or the like.

In one or more of the various embodiments, modeling engines may be arranged to employ various features or meta-data that may be associated with the data source to influence the determination of candidate relationships. For example, in some embodiments, if the data source includes column headers/labels, the modeling engine may be arranged to search for one or more well-known label values that may indicate a relationship may be found. For example, if data columns are labeled as 'Address Line 1', 'Address Line 2', City, or the like, modeling engines may be configured activate one or more evaluators directed to identifying address-related fields/column that may be candidate relationships.

In some embodiments, modeling engines may be arranged to employ one or more separate services, external or internal, to evaluate or classify one or more field values. Accordingly, in some embodiments, modeling engines may be configured to submit one or more field values to services to confirm postal codes, email addresses, user identity, identify spelling errors, lookup product codes, or the like. In some embodiments, such information may be employed to help identify one or more candidate relationships.

At block 810, in one or more of the various embodiments, the modeling engine may be arranged to prune or sort the candidate relationships based on one or more heuristics, or the like.

In one or more of the various embodiments, modeling engines may be arranged to employ aggressive policies to identify candidate relationships. However, in some embodiments, modeling engines may be arranged to perform one or more actions or evaluations that associate a confidence score, or the like, with candidate relationships that may be used to rank the identified candidate relationships. In some embodiments, a confidence score may be discrete or inferred based on one or more characteristics of the candidate relationship. Also, in some embodiments, modeling engines may be arranged to several different evaluators to identify candidate relationships. In some embodiments, the different evaluators may be associated with score, or the like, that reflect the efficacy of a given evaluator. Accordingly, in some embodiments, the evaluator(s) that contributed to the determination or identification of a candidate relationship may be reflect in the confidence score associated with a candidate relationship.

Further, in some embodiments, modeling engines may be configured to automatically up-rank or down-rank particular relationships or relationship types. In some embodiments, modeling engines may be arranged to employ the ranking to determine if one or more candidate relationships may be excluded from presenting to a user in the relationship panel.

In one or more of the various embodiments, other evaluators may be arranged to identify falsely identified candidate relationships. In some embodiments, modeling engines may be arranged to employ one or more of these evaluators to identify candidate relationships that may be excluded or de-ranked.

In some embodiments, modeling engines may be arranged to automatically hide or de-emphasize one or more candidate relationships in the relationship panel. However, in some embodiments, modeling engines may be arranged to enable users to select if they want to see the candidate relationships that may have been hidden or de-emphasized. For example, relationship panels may include checkbox user interface controls that enable users to see 'all' candidate relationships rather than just the candidate relationships associated with confidence scores that exceed a threshold value.

At block 812, in one or more of the various embodiments, the modeling engine may be arranged to display the one or more candidate relationships in a relationship panel in a user interface. As described above, (See, FIGS. 6A-6C) one or more of the candidate relationships determined by the modeling engine may be displayed in the relationship panel of a user interface. In some embodiments, some of the determined candidate relationships may be withheld from displaying in the relationship panel based on their associated confidence score.

Next, in one or more of the various embodiments, control may be returned to a calling process.

FIG. 9 illustrates a flowchart of process 900 for interactive data modeling in accordance with one or more of the various embodiments. After a start block, at start block 902, in one or more of the various embodiments, a modeling engine may be arranged to display source data fields in a source panel. As described above, modeling engines may be arranged to evaluate data in one or more data sources to determine one or more candidate relationships that may be displayed in the relationship panel.

At block 904, in one or more of the various embodiments, the modeling engine may be arranged to display one or more candidate relationships in a relationship panel. In one or more of the various embodiments, each relationship discovered by the modeling engine may be displayed in the relationship panel. In some embodiments, the format, layout, appearance, or the like, of a particular relationship panel as it appears in a user interface may vary depending on functional or aesthetic design considerations. However, in some embodiments, the user interface may show a data field from the data source that may be considered a key or index value (e.g., primary key) as well as one or more data fields that may be part of the relationship. Thus, in some embodiments, a user may be presented with the key fields and the related fields as determined by the modeling engine.

In one or more of the various embodiments, the relationship panel may be a user interface element that enables a user to browse, scroll, or visually otherwise inspect the candidate relationships. In one or more of the various embodiments, relationship panels may be arranged to respond to hover-type inputs that enable a user to examine relationships without actively clicking a relationship in the relationship panel. Also, in some embodiments, other interactions, such as, hot keys, arrows keys, touches on touchscreens, or the like, may be substituted for hovering input without departing from the scope of these innovations.

At decision block 906, in one or more of the various embodiments, if a user hovers over a relationship in the relationship panel, control may flow to block 908; otherwise, control may loop back block 902.

At block 908, in one or more of the various embodiments, optionally, the modeling engine may be arranged to display one or more candidate data objects based on the identified relationships. In one or more of the various embodiments, the modeling engines may be arranged to render a visualization of how the current data model may be modified if the selected relationships may be incorporated in the data model. In some embodiments, modeling engines may be arranged to display candidate data objects using markup or styling that may indicate that the candidate data objects have yet to be added to the data model. For example, candidate data objects or other candidate data model changes may be displayed in the user interface using particular colors or other visualization features to emphasize that the displayed data objects or data models reflect a potential result that may happen if the changes may be confirmed.

Note, this block is indicated as being optional, because in some cases, for some embodiments, the hovering action may select relationships associated with data objects that may be already displayed or otherwise present in the data model.

At decision block 910, in one or more of the various embodiments, if the user confirms the one or more data objects, control may flow to block 912; otherwise, control may loop back to block 902. In one or more of the various embodiments, modeling engines may be arranged to provide one or more user interface controls that enable a user to accept or reject the proposed changes to the data model.

At block 912, in one or more of the various embodiments, the modeling engine may be arranged to modify the data model based on the one or more confirmed data objects or relationships.

In one or more of the various embodiments, modeling engines may be arranged to modify one or more data structures associated with the data model to capture and persist the proposed data model modifications. In some embodiments, modeling engines may be arranged to re-display the data model using markup or other visualization features that indicate that that proposed changes have been committed to the data model.

Next, in one or more of the various embodiments, control may be returned to a calling process.

Figure 10:
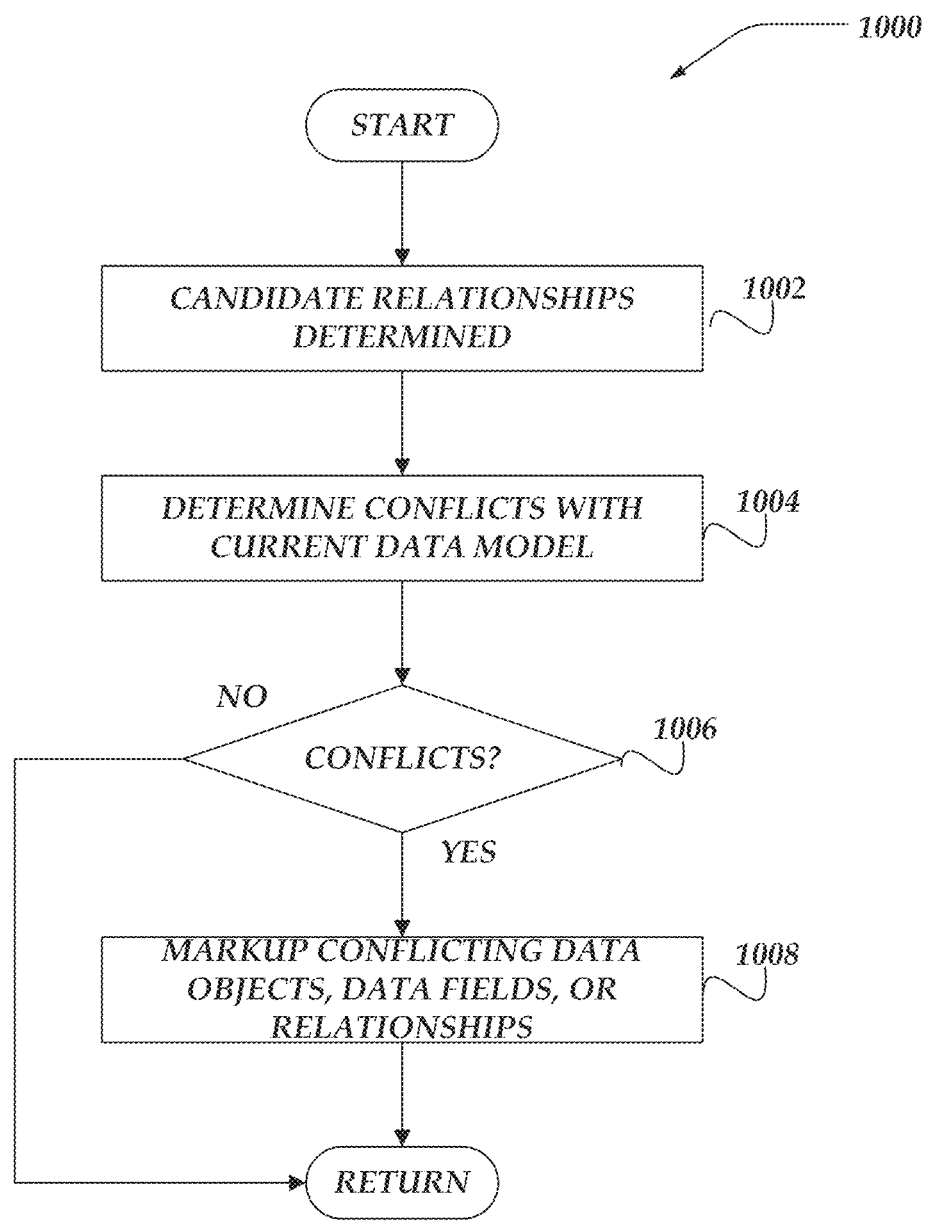
FIG. 10 illustrates a flowchart of a process for interactive data modeling in accordance with one or more of the various embodiments.

FIG. 10 illustrates a flowchart of process 1000 for interactive data modeling in accordance with one or more of the various embodiments. After a start block, at start block 1002, in one or more of the various embodiments, one or more candidate relationships may be determined. As described above, in some embodiments, modeling engines may be arranged to process data in data sources to determine one or more candidate relationships. The candidate relationships may be display in a relationship panel of a user interface.

At block 1004, in one or more of the various embodiments, the modeling engine may be arranged to determine one or more conflicts the one or more relationships may have with the current data model. In one or more of the various embodiments, one or more relationships displayed in the relationship panel may conflict with one or more of the relationships included in the current data model.

Accordingly, in some embodiments, modeling engines may be arranged to evaluate if relationships may be in conflict with the data model by comparing the data objects associated with one or more selected relationships and the data objects in the data model. In some embodiments, this may include comparing the data fields associated one or more candidate relationship data objects with the data objects in the data model. For example, a candidate relationship, such as, Product ID Table (See, Data Object 618 in FIG. 6C), may include data fields, such as, Product ID, Category, or Sub-Category. Accordingly, in this example, if a candidate relationship such as relationship 610 is selected, the corresponding candidate data object (candidate data object 620 in FIG. 6C) may include data fields, such as, Product Name, Category, or Sub-Category. Accordingly, in this example, if the Product Name data object is added to the data model, an ambiguity would be introduced because there would be two data objects that include the same data fields.

In some embodiments, adding data object to a data model that represent some or all of the same data fields may generally be considered to be a conflict because adding them to data model may contravene the goal of providing a normalized data model.

In some embodiments, organizations may desire to provide custom or local modeling rules that may be enforced by the modeling engine. For example, in some embodiments, an organization may declare that one or more relationships or type of relationships should be excluded from data model. Accordingly, in some embodiments, attempts to include relationships that may violate local or custom rules may be considered conflicts as well. Thus, in one or more of the various embodiments, modeling engines may be arranged to employ rules or instructions provided via configuration information to enforce some or all conflicts.

At decision block 1006, in one or more of the various embodiments, if there may be conflicts, control may flow to block 1008; otherwise, control may be returned to a calling process.

At block 1008, in one or more of the various embodiments, the modeling engine may be arranged to markup the conflicting data objects, data fields, or relationships in the user interface. In some embodiments, as conflicting relationships may be considered or otherwise interacted with, the modeling engine may be arranged to automatically markup or otherwise dynamically change the appearance of the data objects or relationships (in the relationship panel, or the like) to bring the conflicts to the attention of user. Further, in some embodiments, modeling engines may be arranged to raise alarms, generate log entries, provide notifications, or the like, if conflicting data objects may be determined. In some embodiments, modeling engines may be arranged to employ rules, instructions, or the like, provided via configuration information to determine some or all of the markup, alarms, notifications, or the like, to employ in response to determining conflicts.

In one or more of the various embodiments, conflict markup may include various user interface treatments, such as, striking through field name or relationships, changing the colors (e.g., red for conflicts, or the like), changing fonts, changing font sizes, specific/additional labeling, warning dialog boxes, or the like. Accordingly, in one or more of the various embodiments, modeling engines may be arranged to employ rules or instructions provided via configuration information to determine some or all of the specific conflict markups to account for local requirements or local circumstances.

Next, in one or more of the various embodiments, control may be returned to a calling process.

It will be understood that each block in each flowchart illustration, and combinations of blocks in each flowchart illustration, can be implemented by computer program instructions. These program instructions may be provided to a processor to produce a machine, such that the instructions, which execute on the processor, create means for implementing the actions specified in each flowchart block or blocks. The computer program instructions may be executed by a processor to cause a series of operational steps to be performed by the processor to produce a computer-implemented process such that the instructions, which execute on the processor, provide steps for implementing the actions specified in each flowchart block or blocks. The computer program instructions may also cause at least some of the operational steps shown in the blocks of each flowchart to be performed in parallel. Moreover, some of the steps may also be performed across more than one processor, such as might arise in a multi-processor computer system. In addition, one or more blocks or combinations of blocks in each flowchart illustration may also be performed concurrently with other blocks or combinations of blocks, or even in a different sequence than illustrated without departing from the scope or spirit of the invention.

Accordingly, each block in each flowchart illustration supports combinations of means for performing the specified actions, combinations of steps for performing the specified actions and program instruction means for performing the specified actions. It will also be understood that each block in each flowchart illustration, and combinations of blocks in each flowchart illustration, can be implemented by special purpose hardware-based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may be directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

What is claimed as new and desired to be protected by Letters Patent of the United States is:

1. A method for managing data models using one or more processors that execute instructions to perform actions, comprising:
    providing a data source that includes one or more records, wherein one or more portions of the data source are denormalized;
    determining one or more source fields based on the one or more records, wherein the one or more source fields are displayed in a source panel on a user interface (UI);
    displaying a data model that includes at least one source data object that is based on the one or more source fields;
    determining one or more candidate relationships between the one or more source fields based on one or more values in the one or more records, wherein each candidate relationship includes one or more candidate data objects that comprise a key field and one or more data fields, and wherein each of the key fields and the one or more data fields for different candidate relationships correspond to different source fields;
    displaying the one or more candidate relationships in a relationship panel; and
    in response to confirming a candidate relationship between the one or more source fields in the relationship panel, performing further actions, including:
        determining a provided key field and one or more provided data fields based on a confirmed data object included with the confirmed relationship;
        generating a data object that includes another key field and one or more other data fields, wherein the other key field corresponds to the provided key field and the one or more other data fields correspond to the one or more provided data fields; and
        modifying the data model to include the generated data object and to remove the one or more source fields that correspond to the one or more other data fields, wherein the modified data model is displayed to a user.

2. The method of claim 1, wherein determining the one or more candidate relationships, further comprises:
    employing one or more evaluators to identify one or more redundant fields in the one or more records; and
    determining a portion of the one or more candidate relationships based on the one or more redundant fields.

3. The method of claim 1, further comprising:
   determining one or more conflicts in the data model or the modified data model based on one or more of the selected key fields or the one or more selected data fields being included in a data object in the data model or in the modified data model; and
   modifying an appearance of the data model or the modified data model to indicate the presence of the one or more conflicts.

4. The method of claim 1, wherein determining the one or more candidate relationships, further comprises:
   associating a confidence score with each of the one or more candidate relationships, wherein the confidence score is determined based on a strength of the one or more candidate relationships;
   employing the confidence score to rank order the one or more relationships; and
   omitting a portion of the one or more candidate relationships from the relationship panel, wherein the score associated with the omitted portion of the one or more candidate relationships is less than a threshold value.

5. The method of claim 1, further comprises, determining the one or more records based on sampling the data source, wherein the one or more records are representative of the data source.

6. A processor readable non-transitory storage media that includes instructions for managing data models, wherein execution of the instructions by one or more processors, performs actions, comprising:
   providing a data source that includes one or more records, wherein one or more portions of the data source are denormalized;
   determining one or more source fields based on the one or more records, wherein the one or more source fields are displayed in a source panel on a user interface (UI);
   displaying a data model that includes at least one source data object that is based on the one or more source fields;
   determining one or more candidate relationships between the one or more source fields based on one or more values in the one or more records, wherein each candidate relationship includes one or more candidate data objects that comprise a key field and one or more data fields, and wherein each of the key fields and the one or more data fields for different candidate relationships correspond to different source fields;
   displaying the one or more candidate relationships in a relationship panel; and
   in response to confirming a candidate relationship between the one or more source fields in the relationship panel, performing further actions, including:
      determining a provided key field and one or more provided data fields based on a confirmed data object included with the confirmed relationship;
      generating a data object that includes another key field and one or more other data fields, wherein the other key field corresponds to the provided key field and the one or more other data fields correspond to the one or more provided data fields; and
      modifying the data model to include the generated data object and to remove the one or more source fields that correspond to the one or more other data fields, wherein the modified data model is displayed to a user.

7. The media of claim 6, wherein determining the one or more candidate relationships, further comprises:
   employing one or more evaluators to identify one or more redundant fields in the one or more records; and
   determining a portion of the one or more candidate relationships based on the one or more redundant fields.

8. The media of claim 6, further comprising:
   determining one or more conflicts in the data model or the modified data model based on one or more of the selected key fields or the one or more selected data fields being included in a data object in the data model or in the modified data model; and
   modifying an appearance of the data model or the modified data model to indicate the presence of the one or more conflicts.

9. The media of claim 6, wherein determining the one or more candidate relationships, further comprises:
   associating a confidence score with each of the one or more candidate relationships, wherein the confidence score is determined based on a strength of the one or more candidate relationships;
   employing the confidence score to rank order the one or more candidate relationships; and
   omitting a portion of the one or more candidate relationships from the relationship panel, wherein the score associated with the omitted portion of the one or more candidate relationships is less than a threshold value.

10. The media of claim 6, further comprises, determining the one or more records based on sampling the data source, wherein the one or more records are representative of the data source.

11. A system for managing data models over a network:
   a network computer, comprising:
      a memory that stores at least instructions; and
      one or more processors that execute instructions that perform actions, including:
         providing a data source that includes one or more records, wherein one or more portions of the data source are denormalized;
         determining one or more source fields based on the one or more records, wherein the one or more source fields are displayed in a source panel on a user interface (UI);
         displaying a data model that includes at least one source data object that is based on the one or more source fields;
         determining one or more candidate relationships between the one or more source fields based on one or more values in the one or more records, wherein each candidate relationship includes one or more candidate data objects that comprise a key field and one or more data fields, and wherein each of the key fields and the one or more data fields for different candidate relationships correspond to different source fields;
         displaying the one or more candidate relationships in a relationship panel; and
         in response to confirming a candidate relationship between the one or more source fields in the relationship panel, performing further actions, including:
            determining a provided key field and one or more provided data fields based on a confirmed data object included with the confirmed relationship;
            generating a data object that includes another key field and one or more other data fields, wherein the other key field corresponds to the provided key field and the one or more other data fields correspond to the one or more provided data fields; and modifying the data model to include the generated data object and to remove the one or more source fields that correspond to the one or more other data fields, wherein the modified data model is displayed to a user; and a client computer, comprising:
a memory that stores at least instructions; and
one or more processors that execute instructions that perform actions, including:
displaying the modified data model on a hardware display.

12. The system of claim 11, wherein determining the one or more candidate relationships, further comprises:
employing one or more evaluators to identify one or more redundant fields in the one or more records; and
determining a portion of the one or more candidate relationships based on the one or more redundant fields.

13. The system of claim 11, further comprising:
determining one or more conflicts in the data model or the modified data model based on one or more of the selected key fields or the one or more selected data fields being included in a data object in the data model or in the modified data model; and
modifying an appearance of the data model or the modified data model to indicate the presence of the one or more conflicts.

14. The system of claim 11, wherein determining the one or more candidate relationships, further comprises:
associating a confidence score with each of the one or more candidate relationships, wherein the confidence score is determined based on a strength of the one or more candidate relationships;
employing the confidence score to rank order the one or more candidate relationships; and
omitting a portion of the one or more candidate relationships from the relationship panel, wherein the score associated with the omitted portion of the one or more candidate relationships is less than a threshold value.

15. The system of claim 11, further comprises, determining the one or more records based on sampling the data source, wherein the one or more records are representative of the data source.

16. A network computer for managing data models over a network, comprising:
a memory that stores at least instructions; and
one or more processors that execute instructions that perform actions, including:
providing a data source that includes one or more records, wherein one or more portions of the data source are denormalized;
determining one or more source fields based on the one or more records, wherein the one or more source fields are displayed in a source panel on a user interface (UI);
displaying a data model that includes at least one source data object that is based on the one or more source fields;
determining one or more candidate relationships between the one or more source fields based on one or more values in the one or more records, wherein each candidate relationship includes one or more candidate data objects that comprise a key field and one or more data fields, and wherein each of the key fields and the one or more data fields for different candidate relationships correspond to different source fields;
displaying the one or more candidate relationships in a relationship panel; and
in response to confirming a candidate relationship between the one or more source fields in the relationship panel, performing further actions, including:
determining a provided key field and one or more provided data fields based on a confirmed data object included with the confirmed relationship;
generating a data object that includes another key field and one or more other data fields, wherein the other key field corresponds to the provided key field and the one or more other data fields correspond to the one or more provided data fields; and
modifying the data model to include the generated data object and to remove the one or more source fields that correspond to the one or more other data fields, wherein the modified data model is displayed to a user.

17. The network computer of claim 16, wherein determining the one or more candidate relationships, further comprises:
employing one or more evaluators to identify one or more redundant fields in the one or more records; and
determining a portion of the one or more candidate relationships based on the one or more redundant fields.

18. The network computer of claim 16, further comprising:
determining one or more conflicts in the data model or the modified data model based on one or more of the selected key fields or the one or more selected data fields being included in a data object in the data model or in the modified data model; and
modifying an appearance of the data model or the modified data model to indicate the presence of the one or more conflicts.

19. The network computer of claim 16, wherein determining the one or more candidate relationships, further comprises:
associating a confidence score with each of the one or more candidate relationships, wherein the confidence score is determined based on a strength of the one or more candidate relationships;
employing the confidence score to rank order the one or more candidate relationships; and
omitting a portion of the one or more candidate relationships from the relationship panel, wherein the score associated with the omitted portion of the one or more candidate relationships is less than a threshold value.

20. The network computer of claim 16, further comprises, determining the one or more records based on sampling the data source, wherein the one or more records are representative of the data source.

* * * * *